(12) United States Patent
Choudhury et al.

(10) Patent No.: US 6,986,608 B2
(45) Date of Patent: Jan. 17, 2006

(54) PASSIVE ALIGNMENT CONNECTION FOR FIBER OPTICS

(75) Inventors: Masum Choudhury, Naperville, IL (US); Anthony L. Moretti, Warrenville, IL (US)

(73) Assignee: Molex Incorporated, Lisle, IL (US)

( * ) Notice: Subject to any disclaimer, the term of this patent is extended or adjusted under 35 U.S.C. 154(b) by 79 days.

(21) Appl. No.: 09/760,682

(22) Filed: Jan. 16, 2001

(65) Prior Publication Data

US 2005/0238290 A1 Oct. 27, 2005

(51) Int. Cl.
G02B 6/38 (2006.01)

(52) U.S. Cl. .............................. 385/59; 385/53; 385/58; 385/54; 385/55; 385/71; 385/70; 385/77

(58) Field of Classification Search .................. 385/59, 385/53, 58, 54, 55, 71, 70, 77
See application file for complete search history.

(56) References Cited

U.S. PATENT DOCUMENTS

| 5,297,228 A | 3/1994 | Yanagawa et al. | 385/129 |
|---|---|---|---|
| 5,557,695 A | 9/1996 | Yamane et al. | 385/49 |
| 5,602,951 A | 2/1997 | Shiota et al. | 385/81 |
| 5,656,120 A | 8/1997 | Ota et al. | 156/293 |
| 5,706,378 A | 1/1998 | Suzuki et al. | 385/49 |
| 5,715,338 A | 2/1998 | Sjolinder et al. | 385/14 |
| 5,818,990 A | 10/1998 | Steijer et al. | 385/49 |
| 5,907,651 A | 5/1999 | Bunin et al. | 385/80 |
| 6,324,323 B1 * | 11/2001 | Benham et al. | 385/49 |

FOREIGN PATENT DOCUMENTS

JP 6-18744 1/1994

* cited by examiner

Primary Examiner—Tarifur R. Chowdhury
Assistant Examiner—George Y. Wang
(74) Attorney, Agent, or Firm—Romi N. Bose

(57) ABSTRACT

Fiber optic connections are accomplished with passive alignment using a modular approach. An improved waveguide substrate has precisely aligned waveguides secured in place, including at an inlet channel, an outlet channel, or both. The waveguides need not extend beyond the face of the inlet or outlet location, and there is no need to have any unsupported fiber optic fibers connect to the waveguide substrate. When provided, a connector module or modules have fiber optic fibers having supported ends which precisely align with the waveguides of the waveguide substrate. Connecting pins typically are provided to insure alignment between waveguides and fibers is easily attained.

38 Claims, 3 Drawing Sheets

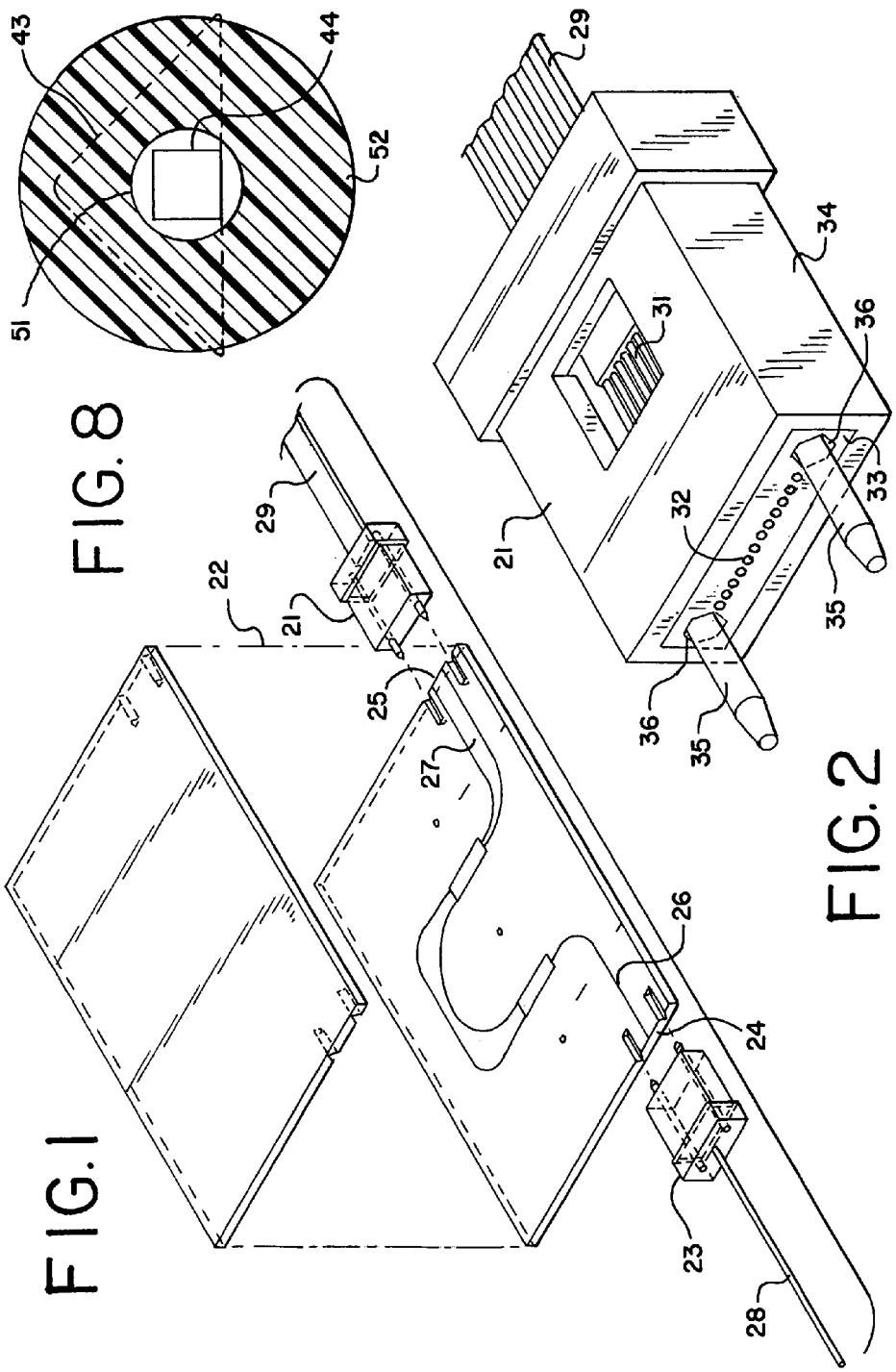

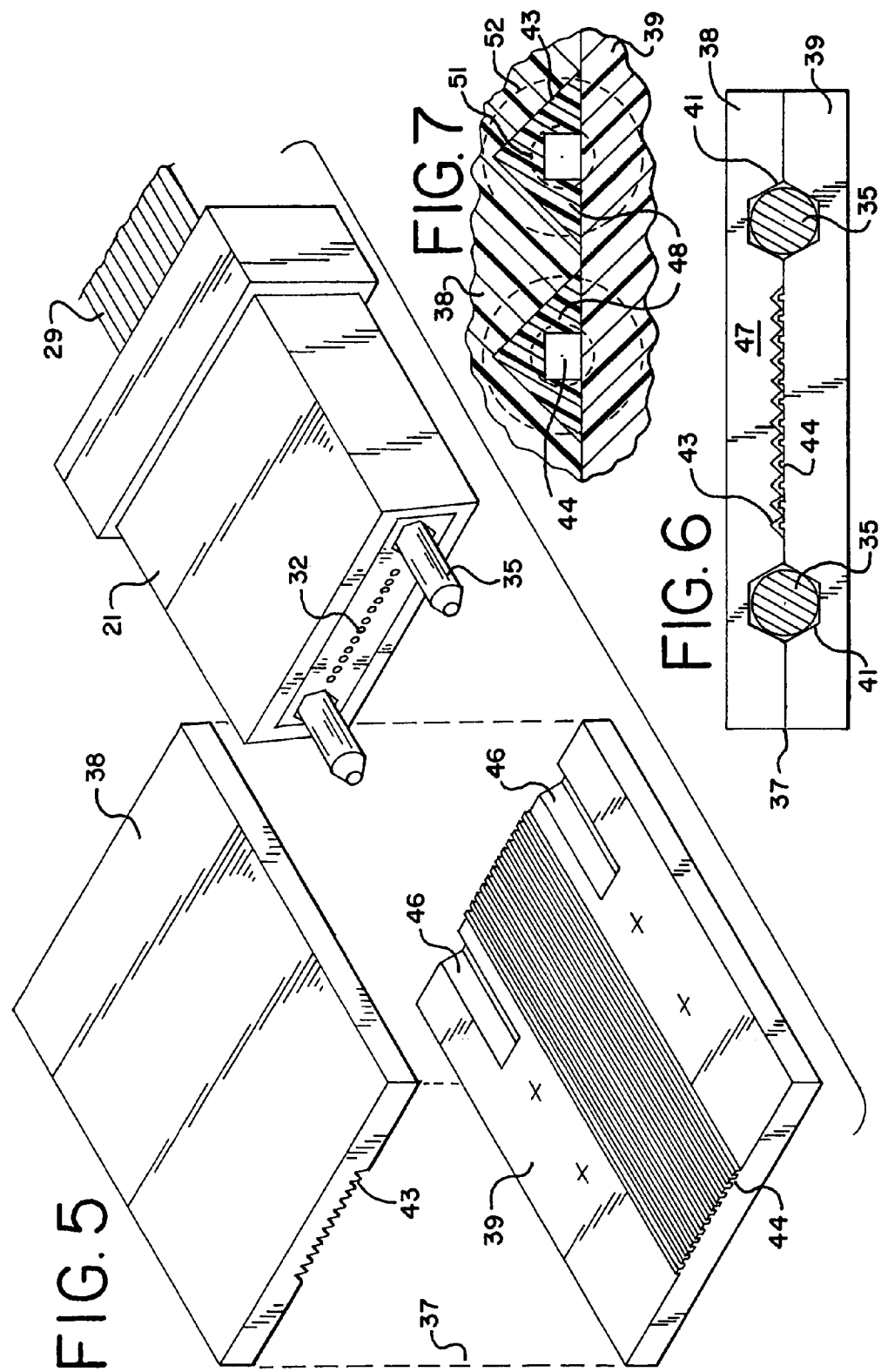

PASSIVE ALIGNMENT CONNECTION FOR FIBER OPTICS

FIELD OF THE INVENTION

This invention generally relates to fiber optic systems, especially connection techniques and devices. More particularly, the invention relates to technology which is suitable for use in optical multiplexing and demultiplexing. Included are so-called dense wavelength division multiplexing (DWDM) products.

BACKGROUND OF THE INVENTION

In fiber optic transmission systems, signals are transmitted along optical fibers by optical frequency waves (light) generated by sources such as light emitting diode (LED) units, lasers, and the like. Optical fibers typically are fabricated of glass materials and, as optical fiber circuitry has developed, it has become necessary to provide connecting devices which can couple one optical fiber to another. It is important that the connection be in an end-to-end aligned relationship.

A traditional procedure for making a connection between ends of optical fibers is to initially remove a protective jacket from a given length of fiber at the end of the fiber to be joined. After the jacket is removed, a 250 micron (outside diameter) buffer is exposed which then can be stripped to expose a 125 micron (outer diameter) fiber. In the prior art, the fiber body then is threaded through a passage in a ferrule where it is affixed in place by adhesive and/or crimping. The fiber is inserted so as to extend well beyond a front surface of the ferrule. The exposed fiber material then is cleaved and polished. Any remaining adhesive is removed. The ferrules then are assembled into a connector assembly which is intended to position the optical fibers with their optical axes in alignment for connection to the fibers of a mating connector or other appropriate connecting device.

Fiber optic ribbon cable has become increasingly popular to provide multiple channels in a single cable structure. An optical ribbon cable is similar to any other well-known ribbon electrical cable to the extent that a plurality of optical fibers or channels are disposed in a line or a generally coplanar relationship. With these approaches, prior art practice for terminating the optical fibers of a fiber optic ribbon cable is generally similar to the procedure summarized above. In general, the unitary protective jacket surrounding the line of fibers is removed so that the buffered fibers are exposed which then are stripped such that the unprotected fibers project from the flat cable in a line. Typically, in the prior art these individual fibers must be inserted into respective individual holes or passages in a prefabricated connector ferrule. The passages align the fibers at a predetermined spacing for coupling to the ends of the fibers in a complementary connector ferrule or other connecting device.

This terminating process of the individual fibers of a multi-fiber cable is accompanied by a number of problems. Because of the very thin size and extremely fragile nature of the fibers, it can be tedious to insert a fiber into a single aligning hole or passage. Where a plurality of such fibers from a single cable need to be inserted into a plurality of passages, the difficulty is multiplied considerably. For example, if a single fiber of a multiple-fiber cable is broken, the stripped cable end and ferrule either must be discarded, reworked, or both. Since these processes typically have been carried out by hand, they can be extremely inefficient and result in unnecessary expense.

In the prior art, placing individual fibers of a multi-fiber cable into individual holes or passages in a connector ferrule results in a high percentage of rejects. The ferrules must be inspected hole by hole. In addition to fibers being broken, the holes-themselves may be too large or too small, or not circular, or have some other defect. Connector ferrules comprise bodies which are crystalline in nature, typically of ceramic material. Instead, they can be molded of a plastic or polymeric material. For multiple channel ferrules, the fiber-receiving holes or passages must be formed precisely to maintain a proper form or alignment and spacing between the fibers in order to prevent tolerance problems causing transmission losses during mating.

Alignment problems and tolerance problems such as those noted above are further complicated in connector assemblies wherein a pair of mating connector ferrules themselves are placed into mating condition by two alignment pins. These alignment pins typically have one end of each pin extending into a passage of the connector ferrule, and the opposite end of the pin is inserted into a passage in the mating connector ferrule, with a chamfered lead-in on the pin for alignment. The problems of maintaining precise tolerances with the alignment pins and their passages must be added to the tolerance problems in maintaining precise spacing and alignment of the individual holes for the optical fibers of the fiber optic cable. It can be understood why there are such a high number of rejects during the application of prior art connector units.

With further reference to DWDM products, multiplexing can be used to combine channels of different wavelengths, whereas at the receiving end demultiplexing separates the channels from one another with a minimum inter-channel cross talk. In DWDM products, the separation between adjacent devices is designed to be fairly narrow in order to increase device capacity. A typical separation is 200 GHz to 50 GHz, corresponding to 1.6 nm and 0.4 nm in wavelength, respectively. Currently available DWDM products are of the arrayed waveguide (AWG) type, such as of the 1×8 (1 input, 8 outputs) 1×16, 1×32 and 1×64 configurations. It will be appreciated that a small difference among the lengths of the output waveguides is responsible for separating the stream of wavelengths from one another.

One of the most important functions in connection with DWDM products is attaching fibers for coupling light in and out of the device with minimum loss. In the past, this has required input and output fibers being first attached to separate platforms at appropriate distances using adhesive glue or curable epoxy. In this prior art approach, these platforms then are brought in close proximity with a device such as a multiplexing and/or demultiplexing device and actively aligned to the appropriate waveguides. An example of a prior art approach is found in Yamane et al. U.S. Pat. No. 5,557,695, in which so-called integral waveguides are provided and the optical fibers are laid in guide grooves as part of the connection procedure.

In the prior art active alignment practice, light is launched into the input fibers, and light emanating from the output fibers is monitored. Determining the optimum coupling position requires using x-y-z movement and rotational movement of the device and the platforms with respect to each other in the vertical and horizontal axes. The pieces then are locked in place with adhesive, glue or curable epoxy. From this it will be appreciated that active alignment is tedious, involved, expensive and slow. Using a fiber optic connector ferrule is useful in precisely aligning a line of fibers for alignment with a complementary ferrule. An example of such an approach and of a type of fixture for assembling same is shown in Bunin et al. U.S. Pat. No. 5,907,657, incorporated hereinto by reference. While ferrules of this type are an important advance in the art, further improvements are realized according to the present invention which achieves an advantageously passive alignment requiring no light up or monitoring of light in the fibers. The passive alignment process of the invention is fast, reproducible, easy and cost effective. So advanced is this approach that accurate alignment according to the invention is achievable in the field by straightforward component removal and replacement. This is a marked improvement over prior art approaches which require alignment in a laboratory environment, typically requiring very expensive alignment equipment.

SUMMARY OF THE INVENTION

In accordance with the present invention, passive alignment fiber optic connection is accomplished using a modular approach. Included is a fiber optic connection system which combines a connector receptacle such as a ferrule together with a receptor substrate which has a plurality of waveguides. The respective ends of these waveguides are positioned such that they are in precise alignment with spacing and positioning of respective ends of the connector receptacle fibers. The substrate can be a chip such as an AWG type of DWDM. It is important to note that the invention avoids the traditional approach of laying fiber optic fibers onto the substrate chip or within grooves of the substrate chip or other component. In order to be assured that the alignment of the respective ends is properly positioned during the passive alignment according to the invention, projecting pins and complementary pin passages orient proper alignment and help to secure that alignment. The invention provides center-to-center alignment between respective ends of fiber optic fibers in one component and respective ends of waveguides of another component when these components are connected to each other.

It is accordingly a general object of the present invention to provide an improved fiber optic passive alignment connection.

Another object of this invention is to provide an improved fiber optic connection component which is readily installed in the field and does not require laboratory conditions or expensive equipment.

Another object of the present invention is to provide an improved system and method which permits replacement of only damaged or faulty components, or those suspected of being faulty, rather than requiring replacement of an entire assembly.

Another object of this invention is an improved system and method which provide a modular approach to fiber optic connection.

Another object of the present invention is to provide an improved chip substrate structure that is a waveguide substrate which neither utilizes fiber optic fibers at points of connection nor receives fiber optic fibers from other components.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 1 is a perspective, partially exploded, view of an illustrated embodiment showing a plurality of connectors or ferrules being passively aligned with a chip substrate having a structure according to the invention;

FIG. 2 is an enlarged perspective view of one of the connector receptacles illustrated in FIG. 1;

FIG. 5 is a different perspective view of the assembly of FIG. 4;

FIG. 6 is an end or face view along the line 6—6 of FIG. 3;

FIG. 7 is an enlarged, detail cross-sectional view along the line 7—7 of FIG. 3, after assembly; and FIG. 8 is a further enlarged, detail cross-sectional view in a direction opposite from that of FIG. 7, through the fiber and after assembly.

DESCRIPTION OF THE PREFERRED EMBODIMENTS

Figures 3, 4:
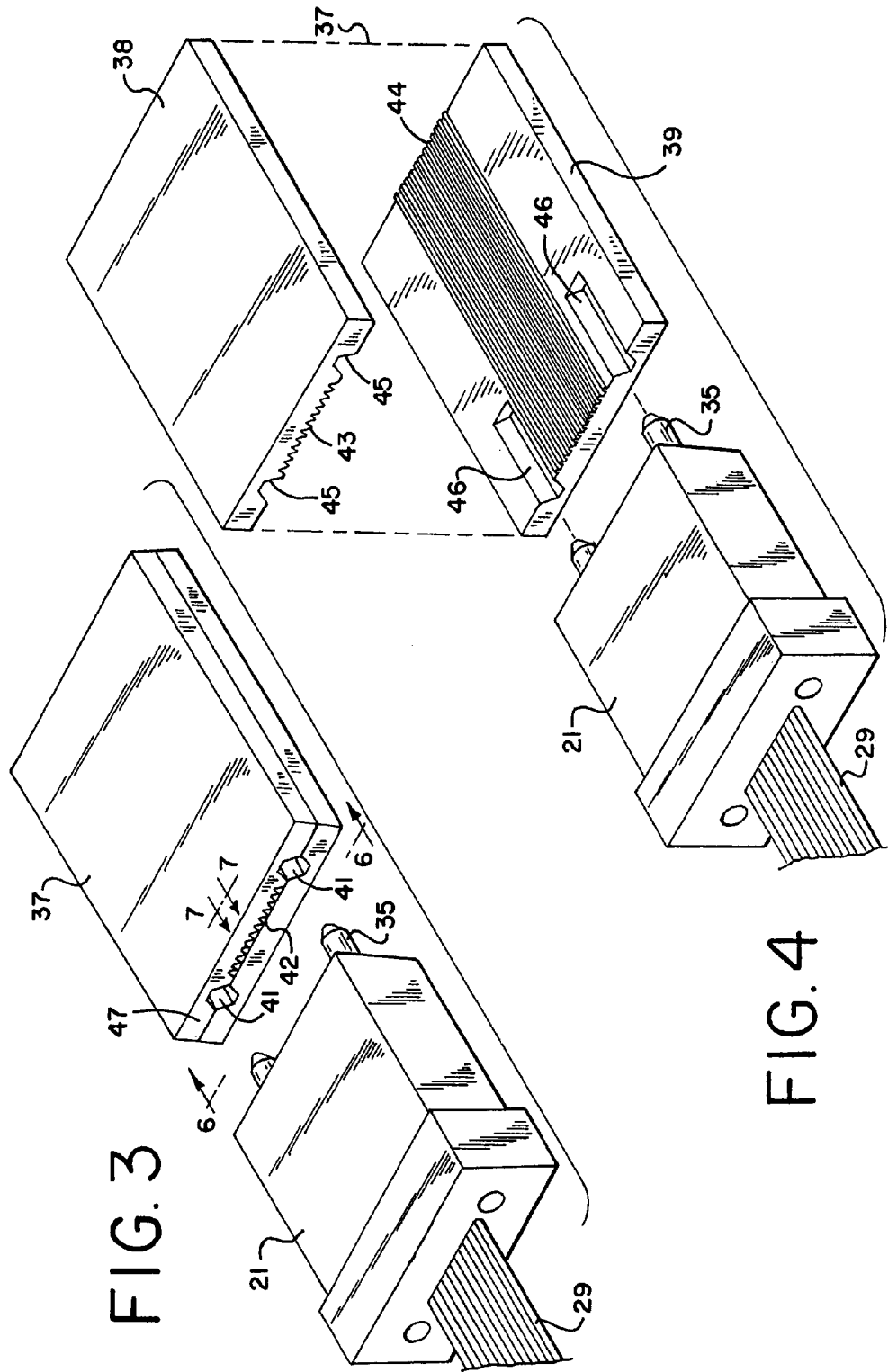
FIG. 3 is a perspective view of a connector receptacle in general alignment for connection with an example of a chip substrate according to the invention.
FIG. 4 is a perspective view in accordance with FIG. 3 and showing the chip substrate in exploded perspective.

In the embodiment which is illustrated in FIG. 1, a connector receptacle or connector ferrule 21 is in general position for aligning assembly with one attachment location of a substrate 22, shown in exploded form in this view. Another connector receptacle 23 likewise is shown in a general mating alignment with a different attachment location of the substrate 22. Each attachment location provides a connection location at which passive alignment takes place, as explained more fully elsewhere herein.

For purposes of illustration, substrate 22 has an input end 24 and an output end 25. The illustrated input end is arranged for accommodating a relatively low number of optical channels 26, while the illustrated output end accommodates a greater number of optical channels 27. Correspondingly, connector receptacle 23 has a fiber optic cable 28 having a relatively low number of optical fibers, while the fiber optic cable 29 has a higher number of optical fibers. It will be appreciated that the number of fibers in each fiber optic cable can vary as required for communication with the particular substrate or chip. For example, both fiber optic cables 28 and 29 can contain the same number of optical fibers. A typical fiber optic ribbon can have 12 fibers, for example. The substrate 22 of FIG. 1 can be seen as an illustration of a 1×12 AWG type DWDM product. Clearly, other combinations of input channels and output channels are contemplated.

The illustrated connector ferrule 21 is shown in more detail in FIG. 2. Fibers 31 of the fiber optic cable 29 are shown. Ends 32 of these fibers are illustrated at the mating face 33. A ferrule body 34 also is shown. Attachment pins in the connector component or in the substrate component are provided to mate with pin passageways in the other component. In the illustrated embodiment, the pins are on the connector component, and the pin passageways or receptors are in the substrate component. As shown, two attachment pins 35 project from the face 33. In a typical assembly each pin 35 is secured within a pin passage 36.

It will be appreciated that these various components of the connector are immovably assembled with respect to each other. Thus, the fiber ends 32 are secured in place, as are the pins 35, in accordance with a predetermined alignment pattern. Pins 35 preferably are precision cylindrical pins having a round cross-section, a typical standard pin in this regard having a diameter of 700 microns, plus or minus 1 micron. A suitable connector receptacle can be made in accordance with Bunin et al. U.S. Pat. No. 5,907,651, incorporated by reference hereinto. FIG. 2 shows a typical suitable example of an empty connector and of its component parts.

FIG. 3, FIG. 4 and FIG. 5 show a portion of the assembly or system of FIG. 1. Only one connector is shown, and the substrate is shown in simplified form in order to illustrated important aspects of the invention. For purposes of illustration, these views show what can be considered to be a portion of the substrate 22 of FIG. 1. For purposes of illustration, this will be identified as a substrate output portion 37. This substrate 37 is composed of two principal structural components, namely an upper wafer 38 and a lower wafer 39, as viewed in the drawings.

When wafers 38 and 39 are assembled together, pin passageways 41 are formed, as illustrated in FIG. 3. In addition, there are one or more waveguide locations 42. These waveguide locations 42 can be formed into the wafer assembly (as shown), or they can be locations which are present between wafers without requiring any channels, grooves or the like formed into a wafer. It is important to note that these waveguide locations are present or are formed without requiring the laying of any optical fibers thereat.

In the embodiment where channels are formed into the wafer assembly, each waveguide location 42 includes a waveguide channel 43 containing a waveguide 44. In this embodiment which is shown, each waveguide channel 43 is triangular in cross-section and is formed into the upper wafer, as viewed in the drawings. In this embodiment as shown, each waveguide 44 is positioned on the lower wafer, as viewed in the drawings. As is typical of waveguides, those illustrated are of a square cross section.

Each of the upper wafer 38 and the lower wafer 39 are made of suitable available materials, and their respective features can be made or located by incorporating generally known techniques and materials. After fabrication, these wafers are secured to each other to form the waveguide substrate 37.

When channels 43 are formed in the upper wafer 38 for example, they typically are formed by means of an etching procedure, such as one incorporating the use of potassium hydroxide. Precise positing of the channels 43 and of upper portions 45 of the pin passageways can be accomplished by using photoresist and masking techniques and known photolithographic types of procedures. This type of approach accomplishes the predetermined alignment pattern discussed herein with respect to the channels and passageways of the upper wafer 38.

The location of the waveguides 44 and of lower portions 46 of the pin passageways 41 in the lower wafer 39 can be formed by known techniques in order to provide the predetermined alignment pattern characteristic of the waveguide substrate 37. Examples of specific processing steps which can be incorporated in forming the features of the waveguide substrate can be found in Yamane et al. U.S. Pat. No. 5,557,695, which is incorporated hereinto by reference. As needed, multiple layers having different refraction indices, typically formed by suitable deposition techniques, can be incorporated. Usually the substrate body is a silicon substrate. Mask patterns having the precise predetermined alignment pattern and spacing typically will be deposited by vapor deposition, sputtering, or some other suitable approach. Typically, these are used in association with an etching procedure. Appropriate energy sources are used, and several steps may be incorporated, in order to complete formation of the predetermined alignment-pattern of the waveguide substrate. The waveguides typically are formed of sol-gel materials, silicon dioxide materials, or other suitable material.

In an important aspect of the invention, the predetermined alignment pattern which is characteristic of the waveguide substrate module 37 is duplicated by an alignment pattern of the fiber ends 32 and the attachment pins 35 of each connector module 21. This is illustrated more particularly by reference to FIG. 6, to FIG. 7 and to FIG. 8.

FIG. 6 illustrates a typical predetermined alignment pattern of the waveguide substrate 37. Ends of the waveguides 44, more particularly the respective centers thereof, are precisely spaced and aligned with respect to each other and with respect to pin passageways 41, more particularly the respective centers thereof. Preferably, these ends of the waveguides also are in alignment with respect to mating face 47 of the waveguide substrate. There is no need for the waveguides to project beyond this mating face 47. In an important embodiment, these waveguide ends are flush with this mating face.

This alignment pattern of the waveguide ends and pin passageways 41 of the waveguide substrate 37 is duplicated in the connector 21. More specifically, fiber ends 32, more particularly the respective centers thereof, follow the identical predetermined alignment pattern of the ends of the waveguides 44. Preferably, these ends 32 of the optical fibers also are in alignment with respect to mating face 33 of the connector module. There is no need for the fibers to project beyond this mating face 33. In an important embodiment, these fiber ends are flush with this mating face.

In addition, the precise predetermined alignment pattern which is characteristic of the pin passageways 41 of the waveguide substrate module is precisely repeated for the attachment pins 35 of the connector module, more particularly the respective centers of the passageways 41 and pins 35.

In summary, after pins 35 are inserted into pin passageways 41, there is passively achieved precise center-to-center alignment of each optical-waveguide end with each respective optical fiber end. Whole registry of these respective ends is facilitated by center-to-center alignment of the respective attachment pins 35 and pin passageways 41, in conjunction with a precise sizing of pins 35 and pin passageways 41 which allows for sliding insertion while avoiding play or movement of the pins within the pin passageways.

FIG. 7 shows waveguide channels 43 accommodating waveguides 44. When desired a suitable filler 48, such as a set epoxy, other adhesive, or other suitable filler material, can be included as shown. Ends of the optic fibers 31 are shown in broken lines in FIG. 7 in order to illustrate the passive center-to-center alignment which is achieved according to the invention. Each end includes a fiber core 51, which is surrounded by body 52 of the fiber itself. This same relationship is shown from an opposite point of view in FIG. 8. It will be appreciated that the relative sizing between the fibers and the waveguide is not to scale in FIG. 7 and FIG. 8. In a typical structure, each waveguide has a side width of about 7 microns, while each fiber core 51 has a diameter of about 9 microns. A typical fiber body 52 has an outer diameter of about 125 microns. A typical cladding which has been removed therefrom at this location of the connector 21 has an outer diameter of about 250 microns.

Preferably, the ends 32 of the fibers, and thus the fiber cores 51 and fiber bodies 52, do not project beyond the mating face 33 of each connector 21. This helps to protect the fibers and to assure that they remain in the predetermined alignment pattern because they are fully supported by the mating face 33. Typically, ends 32 are flush with the mating face 33, with the fibers being embedded within the connector 21.

In a typical manufacturing approach, an epoxy or other suitable filler which sets is used. An assembly procedure such as this is instrumental in maintaining the needed alignment. Often, an assembly approach such as this includes polishing the ends and at least a portion of the mating face, which helps to insure a smooth, planer-surface for alignment mating with face 47 which opposes face 33 after assembly of a connector with the waveguide substrate.

With the present invention, there is no requirement for any optical fiber to enter into a receptor of any kind such as a channel associated with the waveguide substrate. Likewise, there is no requirement for any optical waveguide to enter into the connector. There is no need to provide any grooved receptors or the like for aligning or connecting any optical fiber.

When desired, the passively aligned connection which is characteristic of the invention can be rendered more stable and secure by attaching together the mating faces 33 and 47. Any suitable attachment means is possible, including a setting adhesive or other glue-type component, specifically including an epoxy adhesive system. Such attachment preferably is at or near the periphery of the engaging faces, so as to not interfere with the optical communication between the fiber ends and the waveguide ends.

The present invention avoids the labor intensive, tedious and potentially imprecise laying down of optical fibers in order to make an optical fiber connection, which typically is accomplished successfully only in a laboratory environment. Instead, with the present invention, a component such as a connector module or a chip module which is damaged or suspected as being defective is removed, such as by pulling the components apart while sliding the attachment pins 35 out of the pin passageways 41, followed by reinsertion after appropriate replacement. This can be accomplished in the field, rather than requiring return to a manufacturing facility or laboratory environment in order to achieve the needed connection when replacements or repairs are needed. Moreover, this field work can be in the nature of "trouble shooting" work during which modules can be exchanged until the defective component is identified and replaced.

It will be understood that the embodiments of the present invention which have been described are illustrative of some of the applications of the principles of the present invention. Numerous modifications may be made by those skilled in the art without departing from the true spirit and scope of the invention.

We claim:

1. A passive alignment fiber optic connection system, comprising:
    a connector module having a plurality of fiber optic fibers having ends terminating at a face of said connector module;
    a substrate module having a plurality of waveguides having ends terminating at a first face or at a second face of said substrate module to define an input end and an output end which are different from each other;
    at least two pins projecting from one of said modules at pin locations;
    at least two pin passages within another of said modules at pin locations and through said face thereof, respective said pin passages being sized, shaped and positioned to receive respective said projecting pins, the pin passages and projecting pins being precisely sized to eliminate movement between the pin passages and projecting pins when the projecting pins are inserted into the pin passages;
    said ends of said fiber optic fibers are spaced from one another and from said pin locations of the connector module in accordance with a predetermined alignment pattern, and said ends of said waveguides are spaced from one another and from said pin locations of the substrate module in accordance with said predetermined alignment pattern, whereby each of said respective waveguides optically aligns with each of said respective fibers when said modules are attached together; and
    said substrate module includes at least two wafers assembled together, and prior to assembly a first said wafer has said plurality of waveguides positioned thereon, and after assembly a second said wafer opposes said first wafer and accommodates said plurality of waveguides positioned on said first wafer.

2. The fiber optic connection system in accordance with claim 1, wherein said respective ends of the fiber optic fibers are in center-to-center alignment with said respective ends of the waveguides.

3. The fiber optic connection system in accordance with claim 1, wherein said respe4ctive ends of the fiber optic fibers are flush with said face of the connector module.

4. The fiber optic connection system in accordance with claim 1, wherein said respective ends of the waveguides are flush with said face o the substrate module.

5. The fiber optic connection system in accordance with claim 1, wherein said respective ends of the fiber optic fibers are closely spaced from said respective ends of the waveguides.

6. The fiber optic connection system in accordance with claim 1, wherein said respective ends of the fiber optic fibers are in contact with said respective ends of the waveguides.

7. The fiber optic connection system in accordance with claim 1, wherein said face of the connector is generally perpendicular to respective lengths of said fiber optic fibers including said ends of the respective fibers.

8. The fiber optic connection system in accordance with claim 1, wherein said face of the substrate if generally perpendicular to respective lengths of said waveguides including said ends of the respe4ctive waveguides.

9. The fiber optic connection system in accordance with claim 1, wherein said respective ends of said fiber optic fibers are closely spaced from and in center-to-center alignment with said respective ends of said waveguides.

10. The fiber optic connection system in accordance with claim 1, wherein said respective ends of said fiber optic fibers contact said respective ends of said waveguides and are in center-to-center alignment therewith.

11. The fiber optic connection system in accordance with claim 1, wherein:
    said face of the connector is generally perpendicular to respective lengths of said fiber optic fibers including said ends of the respective fibers;
    said face of the substrate is generally perpendicular to respective lengths of said waveguides including said ends of the respective waveguides; and
    said respective ends of said fiber optic fibers are in center-to-center alignment with said respective ends of said waveguides.

12. The fiber optic connection system in accordance with claim 1, wherein said input end of the substrate module has a different number of waveguide ends than does said output end of the substrate module.

13. The fiber optic connection system in accordance with claim 1, wherein said substrate contains no fiber optic fibers.

14. The fiber optic connection system in accordance with claim 1, wherein said substrate module is devoid of grooves for receiving fiber optic fibers from the connector module.

15. The fiber optic connection system in accordance with claim 1, wherein said system has more than one said connector, one said connector is provided for attachment with said input end, and another aid connector is provided for attachment with said output end of the substrate module.

16. The fiber optic connection system in accordance with claim 1, wherein said second wafer has a plurality of channels which accommodate said plurality of waveguides when the wafers are assembled together.

17. The fiber optic connection system in accordance with claim 16, wherein said substrate contains no fiber optic fibers.

18. The fiber optic connection system in accordance with claim 17, wherein said substrate is devoid of grooves for receiving fiber optic fibers from the connector module.

19. The fiber optic connection system in accordance with claim 16, wherein said channels of the substrate contain a filler which accommodates said waveguides.

20. A passive alignment fiber optic substrate module, comprising:
   a substrate body having a first face and a second face;
   a plurality of waveguides which are within said substrate body and which have first ends terminating at said first face and second ends terminating at said second face of the substrate module to define an input end and an output end which are different from each other;
   a pin location at said first face, and a pin location at said second face;
   said first ends of said waveguides are spaced from one another and from one said pin location and said second ends are spaced from one another and from another said pin location of the substrate module in accordance with respective predetermined alignment patterns etched as accurately as the crystal structure of the substrate material into the substrate body, which are adapted to coincide with fiber optic fibers and pin locations of another component; and
   said substrate body includes at least two wafers assembled together, and prior to assembly a first said wafer has said plurality of waveguides positioned thereon, and after assembly a second said wafer opposes said first wafer and accommodates said plurality of waveguides positioned on said first wafer.

21. The fiber optic substrate module in accordance with claim 20, wherein said predetermined alignment pattern coincides with an alignment pattern of a connector module having at least two pin locations and a plurality of fiber optic fibers having ends terminating at a face thereof, whereby each of said respective waveguides are adapted to optically align with each respective fiber ends.

22. The fiber optic substrate module in accordance with claim 20, wherein said alignment pattern is center-to-center alignment.

23. The fiber optic substrate module in accordance with claim 20, wherein said respective ends of the waveguides are flush with said face of the substrate module.

24. The fiber optic substrate module in accordance with claim 20, wherein said face of the substrate is generally perpendicular to respective lengths of said waveguides including said ends of the respective waveguides.

25. The fiber optic substrate module in accordance with claim 20, wherein said input end of the substrate module has a different number of waveguide ends than does said output end of the substrate module.

26. The fiber optic substrate module in accordance with claim 20, wherein said substrate contains no fiber optic fibers.

27. The fiber optic substrate module in accordance with claim 20, wherein said substrate module is devoid of grooves for receiving fiber optic fibers.

28. The fiber optic substrate module in accordance with claim 20, wherein said second wafer has a plurality of channels which accommodate said plurality of waveguides when the wafers are assembled together.

29. The fiber optic substrate module in accordance with claim 28, wherein said body contains no fiber optic fibers.

30. The fiber optic substrate module in accordance with claim 28, wherein said channels of the body contain a filler which accommodates said waveguides.

31. A method for passive optical alignment of a fiber optic connection system, comprising the steps of:
   providing a connector module having a plurality of fiber optic fibers having ends terminating at a face of the connector module and having at least two pin locations;
   spacing said ends of the fiber optic fibers and said pin locations in accordance with a predetermined alignment pattern;
   assembling, by an assembly procedure separate from said providing step, a substrate module having a plurality of waveguides having ends terminating at a face of the substrate module and having at least two pin locations;
   spacing said ends of the waveguides from one another and from said pin locations of the substrate module in accordance with said predetermined alignment pattern;
   attaching the connector module and substrate module together in order to thereby automatically optically align each of the respective waveguides with each of the respective fibers when the modules are attached together; and
   wherein said substrate module assembling procedure includes:
   forming a wafer having a plurality of aligned respective channels chemically etched therein as accurately as the crystal structure of the substrate material;
   forming another wafer having a plurality of aligned respective waveguides; and
   assembling the two wafers together such that the plurality of aligned respective channels accommodate the plurality of aligned respective waveguides.

32. The method in accordance with claim 31, wherein said attaching step automatically aligns respective ends of the fiber optic fibers in center-to-center alignment with respective ends of the waveguides.

33. The method in accordance with claim 31, wherein said providing and assembling steps result in the ends of the fiber optic fibers being flush with the face of the connector module and the ends of the waveguides being flush with the face of the substrate module.

34. The method in accordance with claim 31, wherein after said attaching step the respective ends of the fiber optic fibers are closely spaced from the respective ends of the waveguides.

35. The method in accordance with claim 31, wherein after said attaching step the respective ends of the fiber optic fibers are in contact with said respective ends of the waveguides.

36. The method in accordance with claim 31, wherein said attachment step results in the respective ends of the fiber optic fibers being closely spaced from and in center-to-center alignment with the respective ends of the waveguides.

37. The method in accordance with claim 31, wherein the respective ends of the fiber optic fibers contact the respective ends of said waveguides and are in center-to-center alignment therewith.

38. The method in accordance with claim 31, wherein said assembling procedure includes filling the channels of the substrate while accommodating the waveguides.

* * * * *